United States Patent

Umezu et al.

[11] Patent Number: 5,862,163
[45] Date of Patent: Jan. 19, 1999

[54] APPARATUS FOR GENERATING ULTRAVIOLET LASER RADIATION

[75] Inventors: Nobuhiko Umezu, Chiba; Hiroyuki Wada, Kanagawa; Koichi Tatsuki, Kanagawa, all of Japan

[73] Assignee: Sony Corporation, Tokyo, Japan

[21] Appl. No.: 847,759

[22] Filed: Apr. 23, 1997

[30] Foreign Application Priority Data

Apr. 25, 1996 [JP] Japan ................................. 8-105682

[51] Int. Cl.⁶ .................. H01S 3/10; G02F 1/35
[52] U.S. Cl. .................. 372/21; 372/22; 372/23; 372/39; 372/69; 372/70; 359/326
[58] Field of Search .......................... 372/21, 22, 23, 372/28, 32, 43, 49, 50, 39, 40, 69, 70, 71, 72, 92, 98, 99, 109; 359/326, 328

[56] References Cited

U.S. PATENT DOCUMENTS

| | | |
|---|---|---|
| 5,034,951 | 7/1991 | Edelstein et al. ................. 372/22 |
| 5,144,630 | 9/1992 | Lin ................................. 372/22 |
| 5,264,959 | 11/1993 | Barker et al. .................... 359/328 |
| 5,520,679 | 5/1996 | Lin ................................. 606/5 |
| 5,552,926 | 9/1996 | Owa et al. ....................... 359/326 |
| 5,592,326 | 1/1997 | Taira ............................... 359/326 |
| 5,745,284 | 4/1998 | Goldberg et al. ................ 359/344 |

*Primary Examiner*—Brian Healy
*Attorney, Agent, or Firm*—Hill & Simpson

[57] ABSTRACT

An apparatus for generating ultraviolet laser radiation according to the present invention includes a laser light source and a frequency conversion device made of a nonlinear optical crystal on which laser light irradiated from the laser light source is made incident and which converts a frequency of the incident laser light to thereby irradiate the ultraviolet radiation. A protective film which prevents oxygen and water content from permeating thereinto is deposited on at least an output end surface, from which ultraviolet radiation is irradiated, of the nonlinear optical crystal. Therefore, it is possible to prevent characteristics of the frequency conversion device from being lowered due to change of a property thereof resulting from increased output power of laser light and to increase a lifetime thereof.

9 Claims, 3 Drawing Sheets

APPARATUS FOR GENERATING ULTRAVIOLET LASER RADIATION

BACKGROUND OF THE INVENTION

The present invention relates to a high-power ultraviolet laser light generating apparatus having a frequency converter.

There has been an ultraviolet radiation generating apparatus which employs green laser light or ultraviolet laser light as incident light and converts a frequency of the laser light by using a frequency conversion device made of a nonlinear optical crystal to thereby generate ultraviolet laser light or ultraviolet laser light having a shorter wavelength.

A β-BBO (β-$BaB_2O_4$) crystal that is a nonlinear optical crystal is frequently used to manufacture the frequency conversion device used in such ultraviolet radiation generating apparatus. Such BBO crystal has no deliquescence and chemical stability and can easily be processed in the air, and hence such BBO crystal is used to manufacture the frequency conversion device used for stably generating ultraviolet radiation. However, when the frequency conversion device made of the BBO crystal is used to generate high-power ultraviolet radiation having a mean output power of 1 kW/$cm^2$ or higher, a region, from which ultraviolet radiation is irradiated, at an end surface of the BBO crystal is changed in property as time passes. As a result, within a short period of time, i.e., several tens of hours, an optical damage which drastically reduces the ultraviolet light output is produced at the region. Moreover, a so-called Fresnel reflection loss resulting from surface reflection at both of end surfaces of the BBO crystal leads to reflection loss of about 20% of the ultraviolet light output.

As described above, when the ultraviolet radiation generating apparatus generates ultraviolet radiation with a high output power such as a mean output power of 1 kW/$cm^2$ or higher, change in property of the frequency conversion device, i.e., the nonlinear optical crystal becomes a bar to high-output generation of ultraviolet radiation although it does not become a bar to an ordinary low-power generation thereof.

The inventors of the present invention et al. studied and researched the change in property of the nonlinear optical crystal and found that slight deliquescence in the linear optical crystal, e.g., BBO crystal leads to the change in property which becomes a bar to generation of short-wavelength, i.e., high-energy ultraviolet laser light at high output power.

SUMMARY OF THE INVENTION

In view of such aspects, it is an object of the present invention to provide an ultraviolet laser radiation generating apparatus having a frequency conversion device which can stably generate ultraviolet laser light having a mean output power of 1 kW/$cm^2$ or higher.

According to an aspect of the present invention, an apparatus for generating ultraviolet laser radiation includes a laser light source and a frequency conversion device made of a nonlinear optical crystal on which laser light irradiated from the laser light source is made incident and which converts a frequency of the incident laser light to thereby irradiate the ultraviolet radiation. A protective film which prevents oxygen and water content from permeating thereinto is deposited on at least an output end surface, from which ultraviolet radiation is irradiated, of the nonlinear optical crystal.

According to the apparatus for generating ultraviolet laser radiation of the present invention, since the protective film which prevents oxygen and water content from being permeating thereinto is deposited on at least the output end surface, from which ultraviolet radiation is irradiated, of the nonlinear optical crystal forming the frequency conversion device and this output end surface is prevented from being exposed directly to the outside, it is possible to prevent a output end surface from being in contact with oxygen and water content and it is possible to prevent a property of the nonlinear optical crystal from being disadvantageously changed because short-wavelength, i.e., high-energy ultraviolet laser light with high output power is irradiated on the output end surface to thereby cause slight deliquescence of the nonlinear optical crystal. Moreover, it is possible to stably generate ultraviolet laser light for a long period of time, and hence it is possible to increase the lifetime of the apparatus for generating ultraviolet laser radiation.

When the protective film is made of a material whose refractive index is smaller than that of the frequency conversion device, it is possible to effectively reduce a Fresnel reflection loss and hence to increase a output power of the ultraviolet radiation.

DESCRIPTION OF THE PREFERRED EMBODIMENTS

Figure 1:
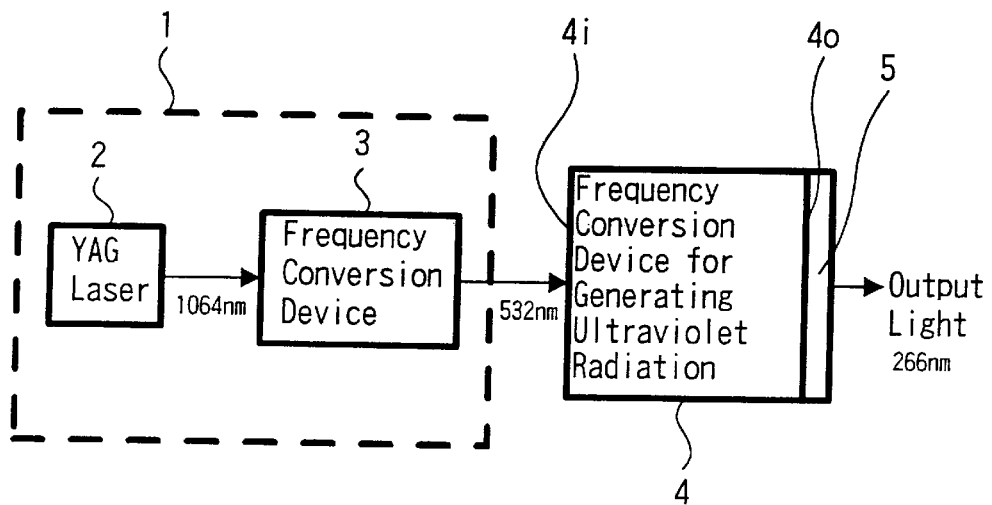
FIG. 1 is a block diagram showing an arrangement of an apparatus for generating ultraviolet laser radiation according to a first embodiment of the present invention.

An apparatus for generating ultraviolet laser radiation according to a first embodiment of the present invention will be described with reference to FIG. 1. In the first embodiment, a high-output ultraviolet laser light generating apparatus is arranged so that a mean output power of output ultraviolet light at a crystal end surface closely relating to production of optical damage is 1 kW/$cm^2$ or higher.

The ultraviolet laser radiation generating apparatus according to the first embodiment is arranged so as to generate ultraviolet radiation having a frequency which is four times as high as that of laser light irradiated from a yttrium aluminum garnet (YAG) laser and having a wavelength of 1064 nm. The ultraviolet laser radiation generating apparatus has a laser light source 1. The laser light source 1 includes a YAG laser 2 for generating laser light having a wavelength of 1064 nm and a frequency conversion device 3 made of a $LiB_3O_5$ (LBO) nonlinear optical crystal, for example, for converting a frequency of the laser light from the YAG laser 2 having a wavelength of 1064 nm to obtain laser light having a wavelength of 532 nm and a frequency twice of that of the laser light from the YAG laser 2.

The laser light having the wavelength of 532 nm from the laser light source 1 is made incident on an ultraviolet radiation generating frequency conversion device 4 made of a Γ-BaB$_2$O$_4$ (BBO) nonlinear optical crystal, for example, for converting a frequency of the incident light into a frequency twice of the frequency of the incident light. This arrangement makes it possible to irradiate laser light having a wavelength of 266 nm and a frequency twice of a frequency of the incident laser light having a wavelength of 532 nm, from the ultraviolet radiation generating frequency conversion device 4 as output light. Specifically, it is possible to obtain laser light having a frequency which is four times as high as that of the initial laser light having a wavelength of 1064 nm as light output from the frequency conversion device 4.

In this arrangement, a protective film 5 is deposited on an output end surface 4o of the nonlinear optical crystal forming the ultraviolet radiation generating frequency conversion device 4 for irradiating ultraviolet radiation as output light. The protective film 5 is formed of a film which prevents oxygen and water content from permeating thereinto and which provides a high transmittance of ultraviolet radiation and has a small refractive index as compared with that of the nonlinear optical crystal forming the frequency conversion device 4, e.g., a film made of MgF$_2$.

When the protective film 5 is formed, the nonlinear optical crystal forming the frequency conversion device 4, e.g., the BBO crystal is disposed in a vacuum evaporator and water content adhered to a surface of the BBO crystal is initially removed. The water content can be removed when high vacuum state of 10$^{-5}$ Torr or lower is produced in the vacuum evaporator and then the BBO crystal is heated to a temperature of 300° C. or higher and kept at the temperature for one hour. The water content can be removed also by other suitable method such as irradiation of ultraviolet radiation, plasma cleaning or the like.

The above film which prevents oxygen and water content from permeating thereinto and provides high transmittance of ultraviolet light, e.g., the MgF$_2$ film is deposited by evaporation on at least the output end surface 4o of the BBO nonlinear optical crystal from which water content has been removed as described above.

An optical thickness of the protective film 5 is selected to an optical thickness which makes it possible to prevent oxygen and water content from permeating into the output end surface 4o, where the ultraviolet light is irradiated, of the nonlinear optical crystal, i.e., the BBO crystal in this embodiment of the ultraviolet radiation generating frequency conversion device 4, and also selected to an optical thickness which makes it possible to obtain an effect resulting from no reflection of ultraviolet light at the output end surface 4o Assuming that a wavelength of the ultraviolet light output from the ultraviolet radiation generating frequency conversion device 4 is λ, the optical thickness of the protective film 5 is nλ/4. It is preferable to form the protective film 5 of a dielectric thin film whose thickness is nλ/4 where n is an odd number except 1.

Figure 2:
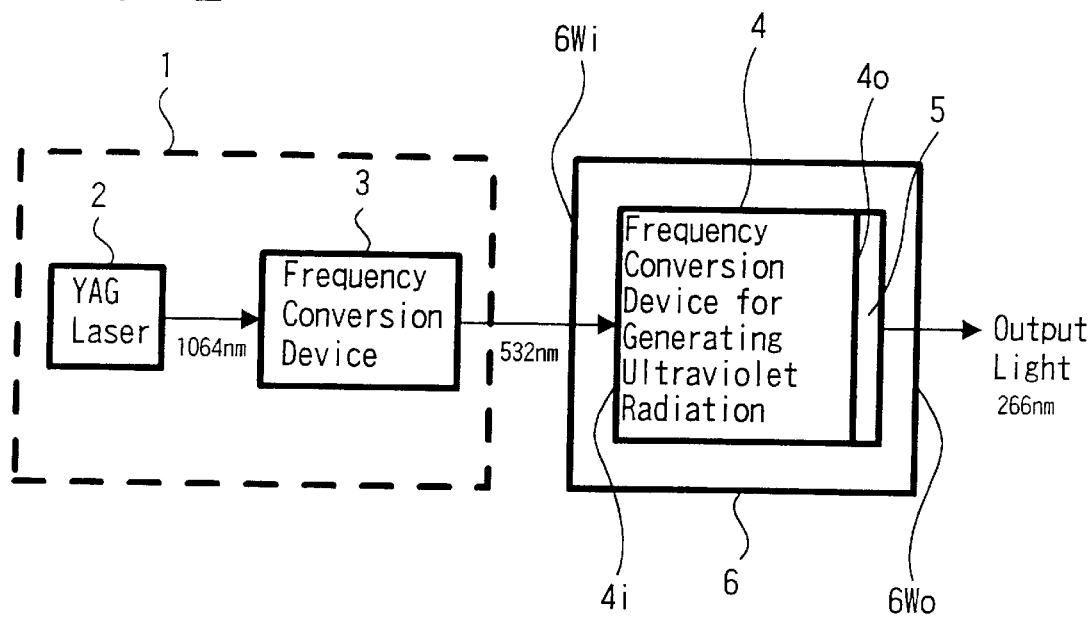
FIG. 2 is a block diagram showing an arrangement of an apparatus for generating ultraviolet laser radiation according to a second embodiment of the present invention.

An apparatus for generating ultraviolet laser radiation according to a second embodiment of the present invention will be described with reference to FIG. 2. An arrangement of the apparatus for generating ultraviolet laser radiation according to the second embodiment is similar to that of the apparatus for generating ultraviolet laser radiation according to the first embodiment, except that an ultraviolet radiation generating frequency conversion device 4 is disposed in an exhausted vacuum chamber 6. The vacuum chamber 6 has an incident window 6Wi and an output window 6Wo. Laser light from a laser light source 1 having a wavelength of 532 nm is made incident on the ultraviolet radiation generating frequency conversion device 4 through the incident window 6Wi, and ultraviolet light output from the frequency conversion device 4 is irradiated through the output window 6Wo which transmits the light output therefrom. Therefore, according to the second embodiment, it is possible to stably generate the ultraviolet radiation.

While in the second embodiment the ultraviolet radiation generating frequency conversion device 4 is disposed in the vacuum chamber 6, it is also possible to stably generate the ultraviolet light by disposing the frequency conversion device 4 in an atmosphere of nitrogen or rare gas such as argon or the like.

Figure 3:
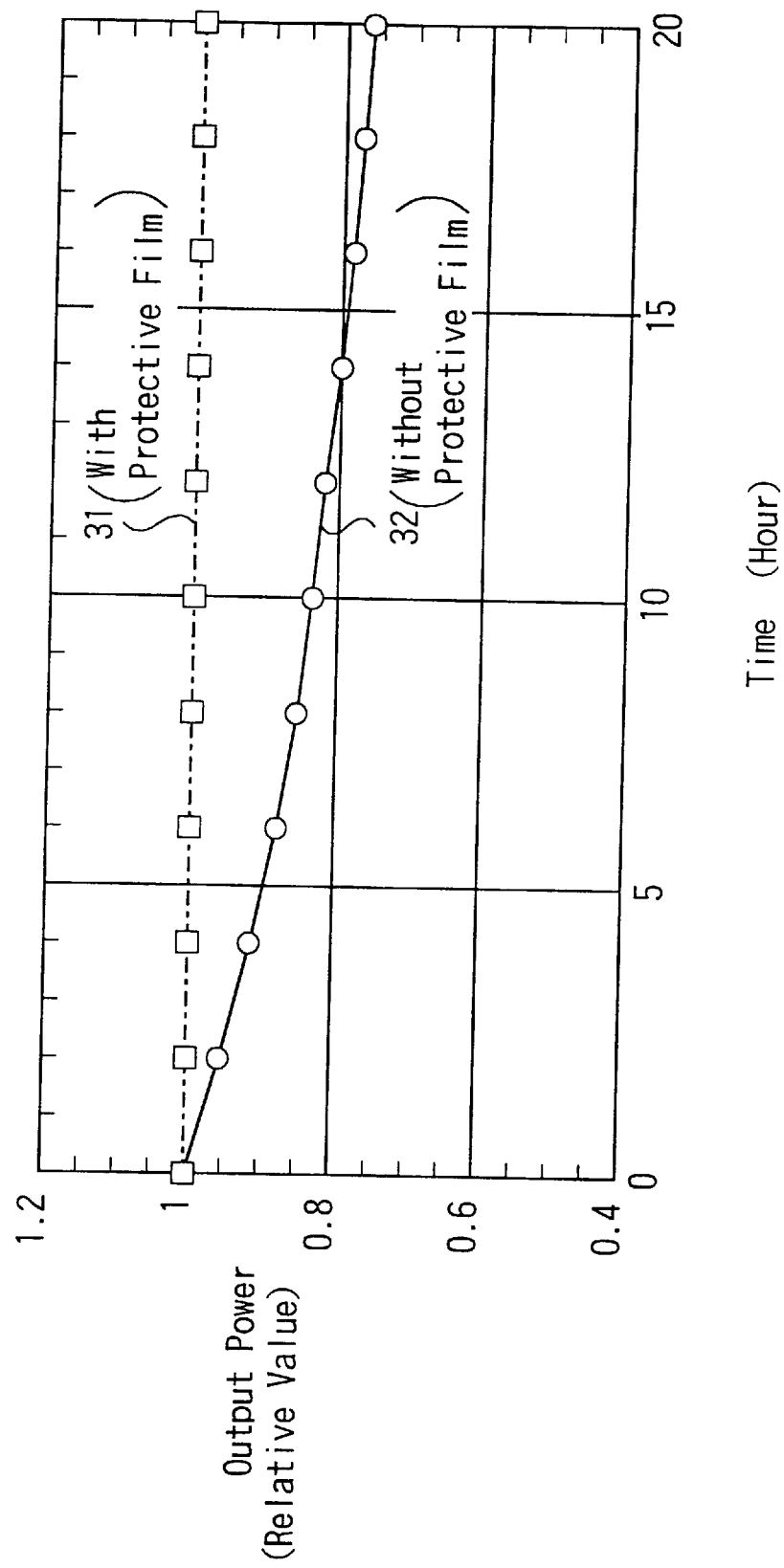
FIG. 3 is a graph showing measured results of output powers of output ultraviolet radiation obtained when a protective film is not deposited on an output end surface of a frequency conversion device and when the protective film is deposited on the output end surface of the frequency conversion device as in the present invention.

FIG. 3 is a graph showing measured results of changes of output powers obtained when output ultraviolet radiation having an output power of 1 kW/cm$^2$ at an output end surface of the frequency conversion device 4 is continuously generated. The measurements were carried out in a clean room having humidity ranging from 20% to 30%. In FIG. 3, a curve 31 indicates measured results of an ultraviolet radiation output power from the frequency conversion device 4 in the above arrangement shown in FIG. 1 in which the protective film 5 made of MgF$_2$ having an optical thickness of 5λ/4 is deposited on the output end surface, from which the ultraviolet light is irradiated, of the nonlinear optical crystal forming the frequency conversion device 4. A curve 32 shown in FIG. 3 indicates measured results of an ultraviolet radiation output power from the frequency conversion device 4 in the above arrangement shown in FIG. 1 in which the protective film 5 is not deposited on the output end surface of the nonlinear optical crystal forming the frequency conversion device 4. Comparison of the curves 31 and 32 reveals that the apparatus for generating ultraviolet laser radiation according to the present invention can provide remarkable improvement in output power degradation.

In the first and second embodiments, since the light incident on the frequency conversion device 4 has a comparatively long wavelength of 532 nm, it is not necessary to deposit the protective film on an input end surface 4i of the nonlinear optical crystal of the frequency conversion device 4 and hence the protective film is not formed thereon. However, if the light incident on the frequency conversion device 4 is ultraviolet radiation having a short wavelength, then the protective film 5 is formed also on the input end surface 4i of the nonlinear optical crystal of the frequency conversion device 4 for generating the ultraviolet radiation by the method similar to those employed in the first embodiment.

Figure 4:
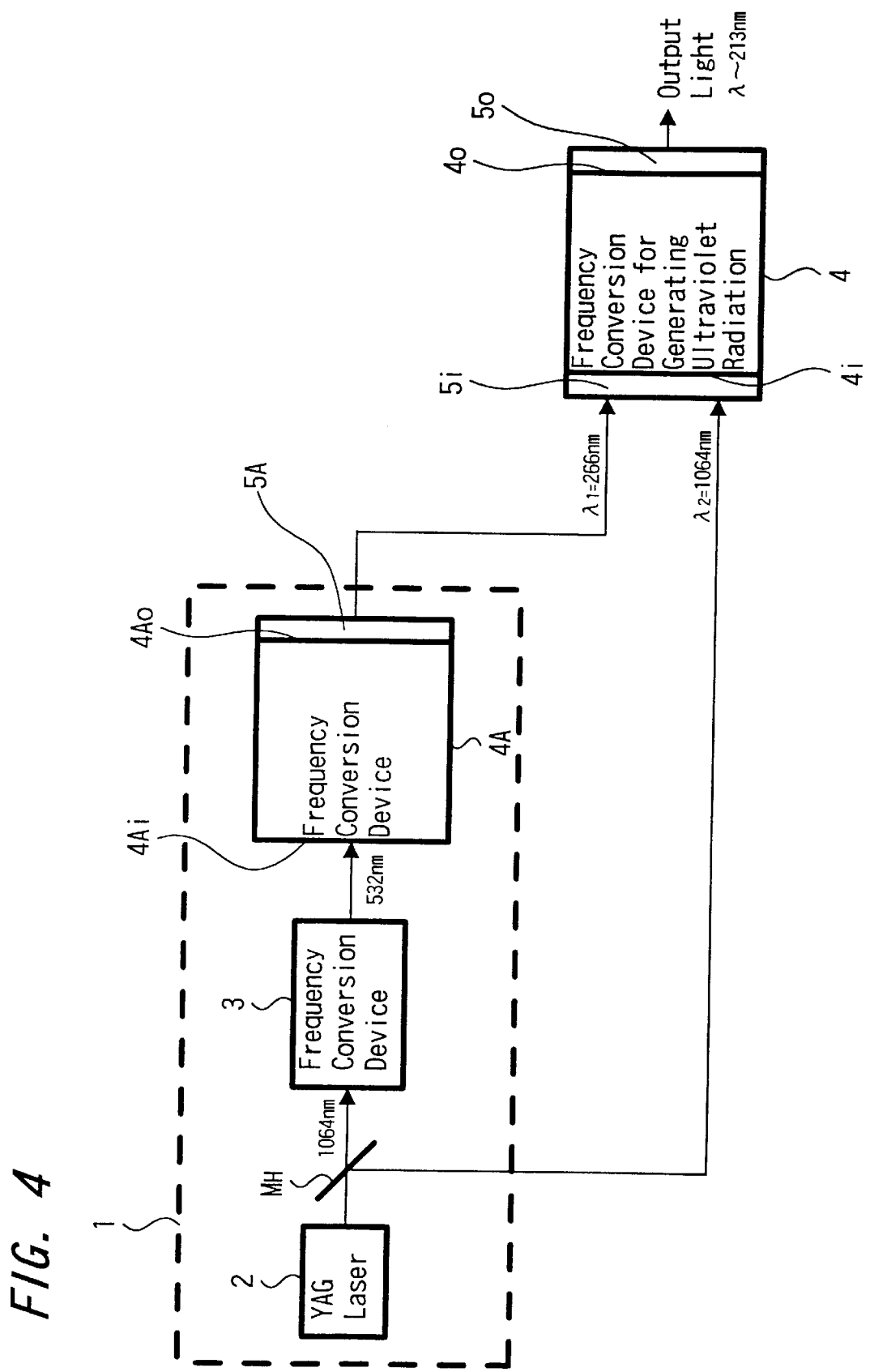
FIG. 4 is a block diagram showing an arrangement of an apparatus for generating ultraviolet laser radiation according to a third embodiment of the present invention.

An apparatus for generating ultraviolet laser radiation according to a third embodiment of the present invention having the such arrangement will be described with reference to FIG. 4. In the third embodiment, the apparatus for generating ultraviolet laser radiation employs two incident lights having wavelengths different from each other, i.e., first incident light having a wavelength of $\lambda_1$=266 nm and second incident light having a wavelength of $\lambda_2$=1064 nm as incident light to derive therefrom output ultraviolet light having a wavelength of $\lambda=\lambda_1\lambda_2/(\lambda_1+\lambda_2)\approx213$ nm.

In the third embodiment, a laser light source 1 has a half mirror M$_H$ which separates laser light irradiated from a YAG laser 2 and having a wavelength of 1064 nm into two rays. One of the separated rays of laser light having the wavelength of 1064 nm is made incident on a frequency conversion device 3 made of a LBO nonlinear optical crystal, for example. The frequency conversion device 3 converts a frequency of the incident laser light to obtain laser light having a wavelength of 532 nm and a frequency twice of that of the incident laser light from YAG laser 2. The obtained laser light having a wavelength of 532 nm is made incident on a frequency conversion device 4A made of a BBO nonlinear optical crystal, for example, which is provided in the laser light source 1 and which has an output end surface 4Ao where a protective film 5A is deposited and an input end surface 4Ai where no protective film is deposited. The frequency conversion device 4A converts the frequency of the laser light having the wavelength of 532 nm into a laser light having a frequency twice of that of the incident laser light from the frequency conversion device 3 having a wavelength of 532 nm to irradiate the frequency-converted laser light as a first laser light having a wavelength of 266 nm. On the other hand, the laser light source 1 irradiates the other rays of the separated rays of laser light separated by the half mirror $M_H$ and having the wavelength of 1064 nm as a second laser light as it is.

The first laser light and the second laser light are made incident on an ultraviolet radiation generating frequency conversion device 4.

Since the frequency conversion device 4 is arranged not only such that ultraviolet light is, of course, irradiated from its output end surface 4o and but also such that ultraviolet light having a wavelength of $\lambda_1$=266 nm is made incident as light incident on the frequency conversion device 4 on its input end surface 4i, not only a protective film 5o is deposited on the output end surface 4o but also a protective film 5i is deposited on the input end surface 4i.

In this arrangement, each of the protective films 5A, 5i and 5o can be formed of a transparent, dielectric film made of $MgF_2$, for example. Especially, an optical thickness of the protective film 5i deposited on the input end surface 4i of the frequency conversion device 4 is selected to an optical thickness which can provide an effect resulting from no reflection of the incident ultraviolet light having a wavelength of $\lambda_1$=266 nm and also selected to an optical thickness which can sufficiently prevent oxygen and water content from permeating into the input end surface 4i, i.e., an optical thickness of $n\lambda_1/4$ where n is an odd number except 1, e.g., $5\lambda_1/4$.

The protective film 5o deposited on the output end surface 4o of the frequency conversion device 4 is selected to an optical thickness which can provide an effect resulting from no reflection of the irradiation ultraviolet light having a wavelength of $\lambda \approx 213$ nm and also selected to an optical thickness which can sufficiently prevent oxygen and water content from permeating into the input end surface 4o, i.e., an optical thickness of $n\lambda_1/4$ where n is an odd number except 1, e.g., $5\lambda/4$.

In the third embodiment, the protective films 5i and 5o which prevent oxygen and water content from permeating thereinto are respectively deposited on the input end surface 4i, on which the ultraviolet radiation is made incident, and the output end surface 4o, from which the ultraviolet radiation is irradiated, of the ultraviolet radiation generating frequency conversion device 4. Therefore, even though high-energy short-wavelength ultraviolet radiation having a high output power is made incident on the input end surface 4i and irradiated from the output end surface 4o, properties of the nonlinear optical crystals at the respective input and output end surfaces 4i and 4o of the frequency conversion device 4 is prevented from being changed, i.e., the respective input and output end surfaces 4i and 4o of the frequency conversion device 4 are prevented from being optically damaged. Moreover, it is possible to stably operate the apparatus for generating ultraviolet laser radiation for a long period of time without the lowing of conversion efficiency, i.e., deterioration of its characteristics, and hence it is possible to increase the lifetime of the apparatus for generating ultraviolet laser radiation.

Moreover, in the first to third embodiments, if each of the protective films 5, 5A, 5i and 5o is formed of a film having a small refractive index as compared with that of the nonlinear optical crystal forming the frequency conversion device 4, then it is possible to reduce a produced Fresnel reflection loss as compared with the arrangement employing no protective film on either of the input and output end surfaces 4i and 4o of the frequency conversion device 4. Moreover, it is possible to reduce a produced optical damage as compared with a protective film having an optical thickness set to (¼) wavelength.

While in the first to third embodiments the ultraviolet radiation generating frequency conversion device 4 is made of the BBO nonlinear optical crystal, the present invention is not limited thereto. If output light having a wavelength of 213 nm, for example, is desired, then the ultraviolet radiation generating frequency conversion device 4 can be made of KBBF ($KBe_2BO_3F_2$) or SBBO ($SrBe_3BO_7$) other than BBO. If output light having a wavelength of 266 nm, for example, is desired, then the ultraviolet radiation generating frequency conversion device 4 can be made of CLBO ($CsLiB_6O_{10}$) other than BBO, KBBF and SBBO. If output light having a wavelength of 357 nm or 532 nm, for example, is desired, then the ultraviolet radiation generating frequency conversion device 4 can be made of LBO ($LiB_3O_5$) other than BBO, KBBF, SBBO and CLBO.

The protective films 5, 5i and 5o which are deposited on such nonlinear optical crystal forming the frequency conversion device 4 and which provide large transmittance of ultraviolet radiation and have small refractive index can be made of some other proper materials such as $Na3AlF_6$, $SiO_2$ or the like other than $MgF_2$.

The apparatus for generating ultraviolet laser radiation according to the present invention is not limited to the above first to third embodiment and can be applied to any arrangement of an ultraviolet laser light generating apparatus.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An apparatus for generating ultraviolet laser radiation, comprising:

a laser light source;

a frequency conversion device which is made of a nonlinear optical crystal and on which laser light irradiated from said laser light source is made incident, said frequency conversion device converting said incident laser light into ultraviolet radiation to irradiate said ultraviolet radiation; and a protective film formed of a film which prevents oxygen and water content from permeating thereinto and coated on an output end surface, where said ultraviolet radiation is irradiated, of said frequency conversion device.

2. An apparatus for generating ultraviolet laser radiation according to claim 1, wherein laser light irradiated from said laser light source is ultraviolet radiation and a protective film which prevents oxygen and water content from permeating thereinto is coated on an input end surface, on which said laser light is made incident, of said frequency conversion device.

3. An apparatus for generating ultraviolet laser radiation according to claim 1, wherein said frequency conversion device is made of a β-BBO crystal.

4. An apparatus for generating ultraviolet laser radiation according to claim 1, wherein said protective film is made of $MgF_2$.

5. An apparatus for generating ultraviolet laser radiation according to claim 1, wherein said protective film is formed of a dielectric film having an optical thickness of $n\lambda/4$ where n is an odd number except 1 and $\lambda$ is a wavelength of ultraviolet radiation irradiated from said frequency conversion device.

6. An apparatus for generating ultraviolet laser radiation according to claim 1, wherein a mean output power of said ultraviolet radiation at said output end surface of said frequency conversion device is 1 $kW/cm^2$ or higher.

7. An apparatus for generating ultraviolet laser radiation according to claim 1, wherein said frequency conversion device is disposed in a vacuum or in an rare gas atmosphere.

8. An apparatus for generating ultraviolet laser radiation, comprising:

a laser light source;

a frequency conversion device which is made of a β-BBO crystal and on which laser light irradiated from said laser light source is made incident, said frequency conversion device converting said incident laser light into ultraviolet radiation to irradiate said ultraviolet radiation whose mean output power at an output end surface of said frequency conversion device is 1 $kW/cm^2$ or higher;

a protective film made of $MgF_2$ and coated on at least an output end surface, from which said ultraviolet radiation is irradiated, of said frequency conversion device, said protective film being a $MGF_2$ film having an optical thickness of $n\lambda/4$ where n is an odd number except 1 and $\lambda$ is a wavelength of the ultraviolet radiation irradiated from said frequency conversion device; and a vacuum chamber in which said frequency conversion device is disposed and in which vacuum is produced or rare gas is filled, said vacuum chamber having an incident window allowing laser light incident on said frequency conversion device to be transmitted therethrough and an irradiation window allowing ultraviolet radiation irradiated from said frequency conversion device to be transmitted therethrough.

9. An apparatus for generating ultraviolet laser radiation, comprising:

a laser light source for irradiating first laser light which is ultraviolet radiation and second laser light having a wavelength longer than that of said first laser light;

a frequency conversion device which is made of a β-BBO crystal and on which said first laser light and said second laser light both irradiated from said laser light source are made incident, said frequency conversion device converting said incident laser light into third laser light which is ultraviolet radiation to irradiate said ultraviolet radiation whose mean output power at an output end surface of said frequency conversion device is 1 $kW/cm^2$ or higher; and protective films made of $MgF_2$ and, respectively, coated on an input end surface, on which said first laser light and said second laser light are made incident, of said frequency conversion device and also coated on an output end surface thereof from which said third laser light is irradiated, said protective film coated on said input end surface being a $MgF_2$ film having an optical thickness of $n\lambda_1/4$ where n is an odd number except 1 and $\lambda_1$ is a wavelength of said first laser light, and said protective film coated on said output end surface being a $MgF_2$ film having an optical thickness of $n\lambda/4$ where n is an odd number except 1 and $\lambda$ is a wavelength of said third laser light irradiated from said frequency conversion device.

* * * * *